(12) United States Patent
Mahamuni

(10) Patent No.: US 10,140,436 B1
(45) Date of Patent: Nov. 27, 2018

(54) PROGRAM OBFUSCATION BY REORGANIZING EXECUTION PATHS

(71) Applicant: Flexera Software LLC, Itasca, IL (US)

(72) Inventor: Ashish Ratnakar Mahamuni, Schaumburg, IL (US)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 15/650,782

(22) Filed: Jul. 14, 2017

(51) Int. Cl.
  *G06F 21/12* (2013.01)
  *G06F 21/14* (2013.01)
  *G06F 8/41* (2018.01)
(52) U.S. Cl.
  CPC ............ *G06F 21/125* (2013.01); *G06F 21/14* (2013.01); *G06F 8/41* (2013.01)

(58) Field of Classification Search
  USPC .......... 726/26, 2, 21, 36; 713/150, 163, 181; 380/255, 264, 276
  See application file for complete search history.

(56) References Cited

U.S. PATENT DOCUMENTS

| | | | | |
|---|---|---|---|---|
| 2007/0240137 A1* | 10/2007 | Archambault | ........ | G06F 8/4442 717/140 |
| 2009/0254893 A1* | 10/2009 | Ahuja | ........ | G06F 8/49 717/152 |
| 2017/0031666 A1* | 2/2017 | Sathyanathan | ........ | G06F 8/41 |

* cited by examiner

*Primary Examiner* — Sharif E Ullah
(74) *Attorney, Agent, or Firm* — Michael A. Glenn; Perkins Coie LLP

(57) ABSTRACT

Intermediate representation (IR) code of source code can be generated for compiling the source code into machine code for an executable program. The IR code can be obfuscated by reorganizing the code based on return types of functions of the IR code to change the execution paths, resulting in an executable program that is difficult to reverse engineer.

20 Claims, 8 Drawing Sheets

PROGRAM OBFUSCATION BY REORGANIZING EXECUTION PATHS

TECHNICAL FIELD

This disclosure relates to program obfuscation, and in particular obfuscating intermediate representation (IR) code during compilation of source code.

BACKGROUND

A compiler is a computer program that transforms source code (e.g., written in a programming language such as C/C++) into an executable program by transforming that source code into object code (e.g., in a lower level programming language such as machine code, assembly, etc.). The conversion of the source code into the executable program also conceals the original source code, making the executable program difficult to modify. For example, the executable program can be difficult to modify by others to perform malicious activity (e.g., adding malware) or remove security mechanisms (e.g., licensing calls enabling functionalities of the executable program) built in the executable program. Unfortunately, the executable program can be reverse engineered and the resulting machine code can then be modified to include such modifications.

SUMMARY

Some of the subject matter described herein includes a method, comprising: generating, by a processor, a first intermediate representation (IR) code of source code for compiling the source code into machine code; identifying a first function and a second function having a first return type in the first IR code, the return type indicating a type of a data structure returned by the first function and the second function when called to be executed; generating, by the processor, a second IR code having a first function including blocks corresponding to the first and second functions from the first IR code that have the first return type; identifying common instructions between the first function and the second function from the first IR code, the common instructions present in both the first function and the second function of the first IR code; generating, by the processor, a common block including the common instructions in the first function of the second IR code; identifying an instruction within the first function of the first IR code representing a function call to the second function of the first IR code; and generating, by the processor, an instruction within the block corresponding to the first function to recursively call the first function of the second IR code and pass a parameter representing that the second block is to be executed based on the identification of the instruction within the first function of the first IR code represents the function call to the second function of the first IR code.

In some implementations, the method includes generating machine code from the second IR code, wherein the machine code represents an executable program that is a result of compiling the source code using the first IR code and the second IR code.

In some implementations, the method includes: identifying a third function and a fourth function having a second return type in the first IR code, the first return type and the second return type being different; and generating, by the processor, a second function for the second IR code including blocks corresponding to the third and fourth functions from the first IR code that have the second return type, the first function and the second function of the second IR code being different.

In some implementations, the method includes: identifying common instructions between the third function and the fourth function from the first IR code, the common instructions present in both the third function and the fourth function of the first IR code; and generating, by the processor, a common block including the common instructions in the second function of the second IR code.

In some implementations, the method includes: identifying an instruction within the third function of the first IR code representing a function call to the fourth function of the first IR code; and generating, by the processor, an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

In some implementations, the IR code, the source code, and the machine code each provide similar executable functionality, and wherein the IR code, the source code, and the machine code are each in a different corresponding programming language.

In some implementations, generating the second IR code corresponds to a linker level pass stage of the compiling, the source code manipulated during a compiler level pass stage of the compiling, the linker level pass stage occurring after the compiler level pass stage.

Some of the subject matter described herein also includes an electronic device, comprising: one or more processors; and memory storing instructions, wherein the processor is configured to execute the instructions such that the processor and memory are configured to: generate a first intermediate representation (IR) code of source code for compiling the source code into machine code; identify a first function and a second function having a first return type in the first IR code, the return type indicating a type of a data structure returned by the first function and the second function when called to be executed; generate a second IR code having a first function including blocks corresponding to the first and second functions from the first IR code that have the first return type; identify common instructions between the first function and the second function from the first IR code, the common instructions present in both the first function and the second function of the first IR code; generate a common block including the common instructions in the first function of the second IR code; identify an instruction within the first function of the first IR code representing a function call to the second function of the first IR code; and generate an instruction within the block corresponding to the first function to recursively call the first function of the second IR code and pass a parameter representing that the second block is to be executed based on the identification of the instruction within the first function of the first IR code represents the function call to the second function of the first IR code.

In some implementations, the processor is configured to execute the instructions such that the processor and memory are configured to: generating machine code from the second IR code, wherein the machine code represents an executable program that is a result of compiling the source code using the first IR code and the second IR code.

In some implementations, the processor is configured to execute the instructions such that the processor and memory are configured to: identify a third function and a fourth function having a second return type in the first IR code, the first return type and the second return type being different; and generate a second function for the second IR code including blocks corresponding to the third and fourth functions from the first IR code that have the second return type, the first function and the second function of the second IR code being different.

In some implementations, the processor is configured to execute the instructions such that the processor and memory are configured to: identify common instructions between the third function and the fourth function from the first IR code, the common instructions present in both the third function and the fourth function of the first IR code; and generate a common block including the common instructions in the second function of the second IR code.

In some implementations, the processor is configured to execute the instructions such that the processor and memory are configured to: identify an instruction within the third function of the first IR code representing a function call to the fourth function of the first IR code; and generate an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

In some implementations, the IR code, the source code, and the machine code each provide similar executable functionality, and wherein the IR code, the source code, and the machine code are each in a different corresponding programming language.

In some implementations, generating the second IR code corresponds to a linker level pass stage of the compiling, the source code manipulated during a compiler level pass stage of the compiling, the linker level pass stage occurring after the compiler level pass stage.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: generate a first intermediate representation (IR) code of source code for compiling the source code into machine code; identify a first function and a second function having a first return type in the first IR code, the return type indicating a type of a data structure returned by the first function and the second function when called to be executed; generate a second IR code having a first function including blocks corresponding to the first and second functions from the first IR code that have the first return type; identify common instructions between the first function and the second function from the first IR code, the common instructions present in both the first function and the second function of the first IR code; generate a common block including the common instructions in the first function of the second IR code; identify an instruction within the first function of the first IR code representing a function call to the second function of the first IR code; and generate an instruction within the block corresponding to the first function to recursively call the first function of the second IR code and pass a parameter representing that the second block is to be executed based on the identification of the instruction within the first function of the first IR code represents the function call to the second function of the first IR code.

In some implementations, the processor is configured to execute the instructions such that the processor and memory are configured to: generate machine code from the second IR code, wherein the machine code represents an executable program that is a result of compiling the source code using the first IR code and the second IR code.

In some implementations, the processor is configured to execute the instructions such that the processor and memory are configured to: identify a third function and a fourth function having a second return type in the first IR code, the first return type and the second return type being different; and generate a second function for the second IR code including blocks corresponding to the third and fourth functions from the first IR code that have the second return type, the first function and the second function of the second IR code being different.

In some implementations, the processor is configured to execute the instructions such that the processor and memory are configured to: identify common instructions between the third function and the fourth function from the first IR code, the common instructions present in both the third function and the fourth function of the first IR code; and generate a common block including the common instructions in the second function of the second IR code.

In some implementations, the processor is configured to execute the instructions such that the processor and memory are configured to: identify an instruction within the third function of the first IR code representing a function call to the fourth function of the first IR code; and generate an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

In some implementations, the IR code, the source code, and the machine code each provide similar executable functionality, and wherein the IR code, the source code, and the machine code are each in a different corresponding programming language.

DETAILED DESCRIPTION

This disclosure describes devices and techniques for obfuscating code. In one example, a multi-pass compiler can generate intermediate representation (IR) code as it transforms source code into object code to generate an executable program. This might be done because IR code is more conducive to processing during the many passes of the multi-pass compiler. One or more of these passes can obfuscate (e.g., modify) the IR code such that reverse engineering or modification of the executable program can be difficult. For example, a first form of IR code might include several functions, each of the functions providing a corresponding return type (i.e., the type of data that is generated as a result of the functionality of the function and returned by the function to another function that calls it, such as an integer, a string, a complex number, etc.). Functions of a similar return type can be identified and combined into a single multi-block function including "blocks" providing the functionality of the functions in a second form of the IR code (i.e., the result of one of the passes of the multi-pass compiler). Additionally, the common code of the functions with similar return types can be identified and provided into its own block in the multi-block function of the second form of the IR code. Moreover, the calls to other functions within the multi-block function can then be modified such that they recursively call the multi-block function and pass a parameter indicating the block corresponding to the function that provided the functionality in the first form of the IR code. The parameter can then be used to select an execution path of the multi-block function to perform the proper functionality in the second form of the IR code.

This results in an obfuscated IR code organized in a way that, when compiled into the executable program, can be difficult to reverse engineer and modify. For example, with separate functions, each would have a separate address which can be used to identify what a function does using a disassembler. By combining many functions into a single multi-block function providing the same functionalities, the executable program can be difficult to reverse engineer with a disassembler because there would be fewer addresses.

Figure 1:
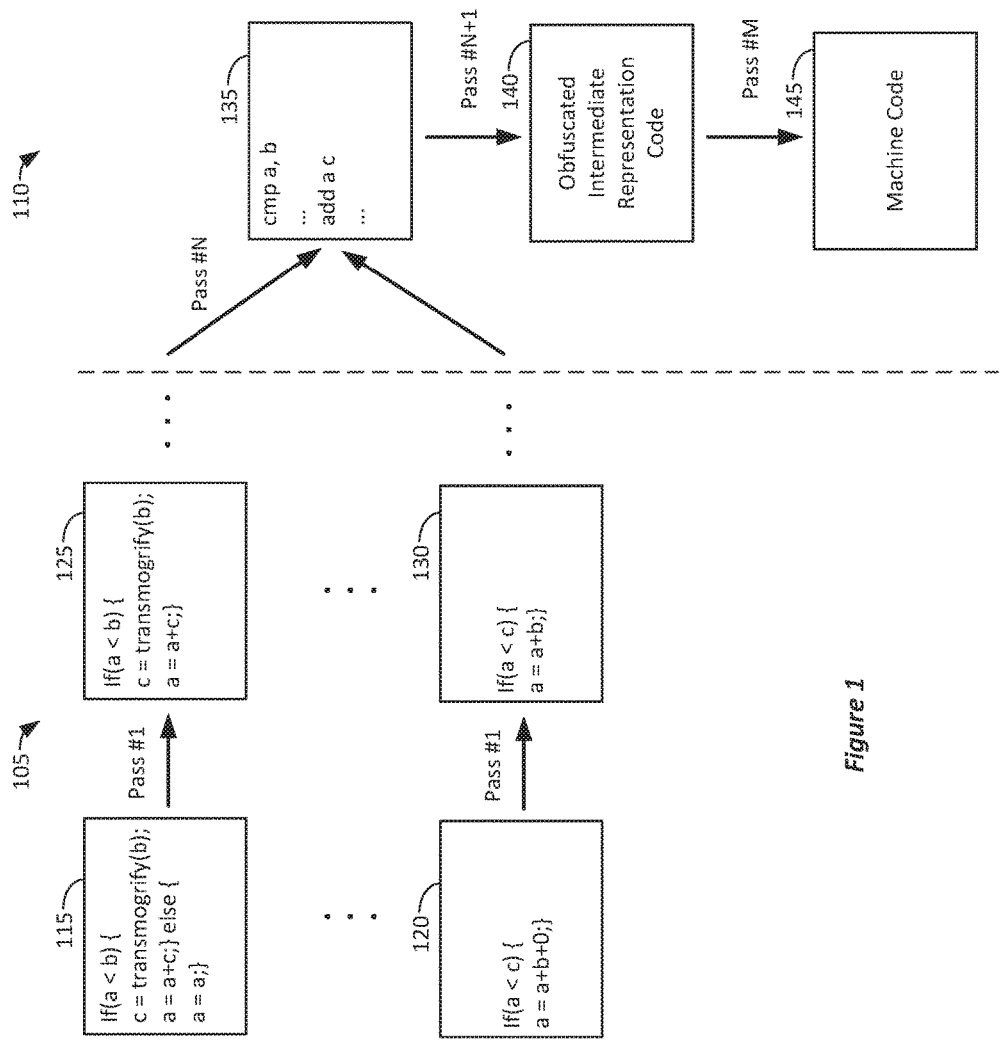
FIG. 1 illustrates an example of a multi-pass compiler.

In more detail, FIG. 1 illustrates an example of a multi-pass compiler. In FIG. 1, the multi-pass compiler can be a type of compiler that processes source code several times, each subsequent pass further processing the result of the previous pass. For example, in FIG. 1, the multi-pass compiler can include two stages: compile level passes stage 105 and linker level passes stage 110. Compile level passes stage 105 can include processing source codes 115 and 120, which can be source code (e.g., written in C/C++ or other types of high level languages) via multiple passes that analyze and manipulate the source code. For example, as depicted in FIG. 1, pass #1 is an optimization technique performed on source codes 115 and 120 to remove unnecessary or redundant code. Thus, source code 125 is similar to source code 115, except it is missing the "else" statement and the logic within the "else" statement because such logic does not affect any program results, allowing for a reduction in the size of the eventual executable program provided by machine code 145. Source code 130 is the same as source code 120 because it does not include logic that does not affect any program results and, therefore, no code was removed following pass #1. Other types of optimization performed in passes during compile level passes stage 105 can include "dead" code removal in which code that would never be executed can be removed.

Eventually, in the multi-pass compiler, source code in a higher level programming language such as C/C++ can be transformed into an intermediate representation (IR) code in a lower level programming language (e.g., lower level than C/C++ such that it is less abstracted away from a central processing unit (CPU)'s instruction set architecture). This can be done because IR code is easier to manipulate and optimize during the compilation process than a higher level programming language. During linker level passes 110, the IR code corresponding to source codes 115 and 120 can eventually be combined into a single source file as IR code 135. This results in a significant amount of code present in a single IR code file. Eventually, that IR code is then used to generate an executable program in machine code providing instructions for a CPU. Thus, the IR code is used by the multi-pass compiler as an intermediate form of code between the source code provided to the compiler and the machine code finally generated by the compiler. As a result, the source code, IR code, and machine code all implement or provide the same functionality when executed, but are written in different programming languages using different types of instructions, syntax, etc. That is, the source code, IR code, and machine code can represent a hierarchy of descending levels of abstraction in terms of abstraction from the CPU's instruction set architecture (e.g., with the source code being the most abstracted away from the CPU's instruction set architecture, the machine code being closest, and the IR code being in between the source code and the IR code in the hierarchy of abstraction) while implementing the same functionality.

In FIG. 1, one or more passes can be performed in the linker level passes stage 110 resulting in modification of IR code 135 to generate obfuscated IR code 140. Obfuscated IR code 140 can implement similar or the same logic or functionalities as IR code 135 when executed (as well as source codes 115 and 120) and within the same programming language, but the structure (e.g., organization such as orderings or groupings of instructions resulting in a change in the execution path, as discussed later herein) can be different such that the eventually generated machine code 145 (e.g., providing the executable program) can be difficult to reverse engineer. Thus, obfuscated IR code 140 can eventually be processed further during linker level passes stage 110 to generate machine code 140 to provide an executable program based on compiling source codes 115 and 120. By obfuscating IR code, more obfuscation can be performed than with source codes 115 or 120, or with machine code 140 because more finely-detailed information regarding the structure of the program can be modified with IR code.

Figure 2:
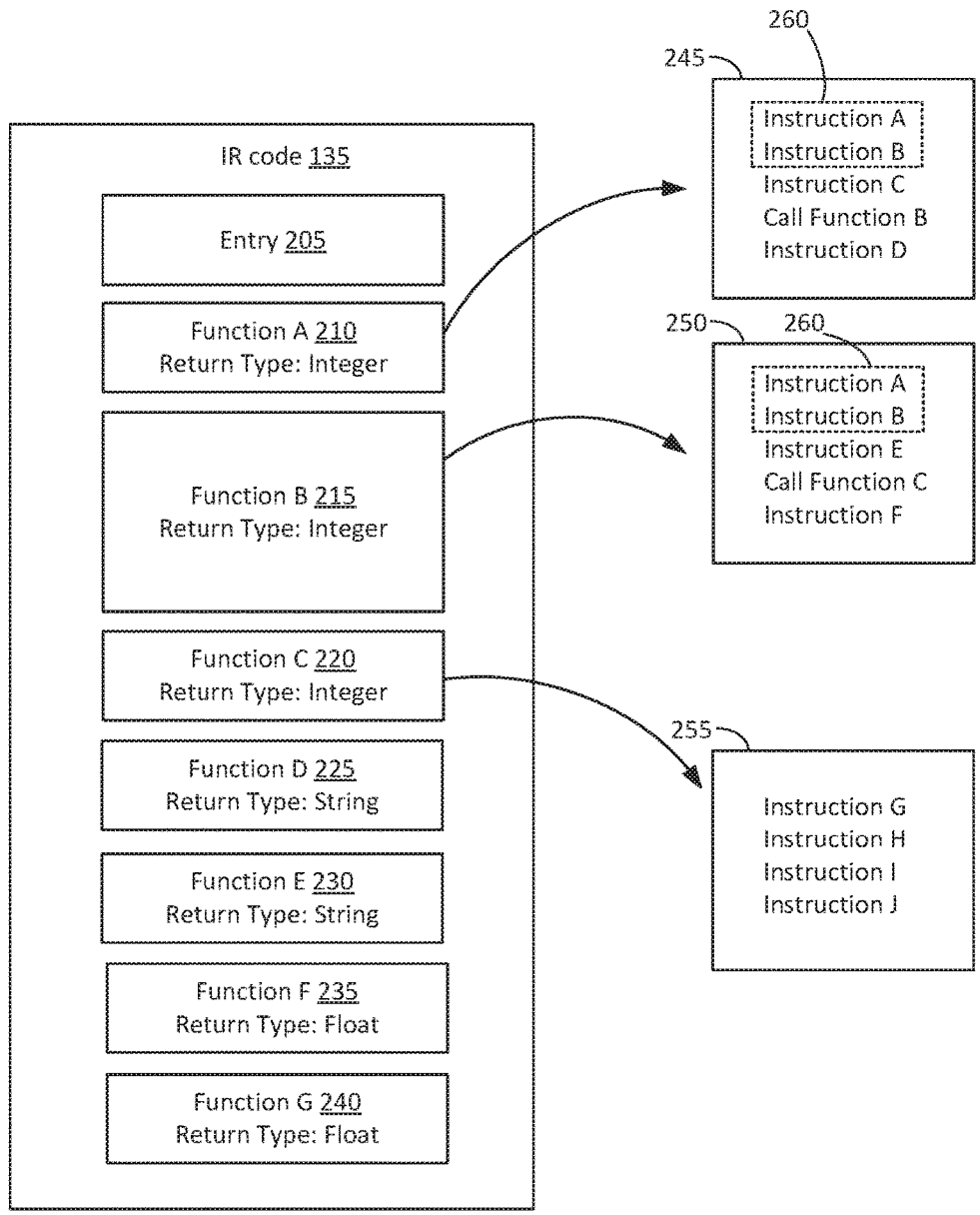
FIG. 2 illustrates an example of identifying return types of functions of intermediate representation (IR) code.

For example, FIG. 2 illustrates an example of identifying return types of functions of intermediate representation (IR) code. In FIG. 2, function A 210, function B 215, and function C 220 can be identified (by a multi-pass compiler) as having an "integer" return type. They may be identified because when those functions are called, they may provide a result back (e.g., to another function calling one of functions A 210, B 215, or C 220) in the form of an integer (e.g., a whole number such as 1, 2, 3, etc.). For example, one function might call another function to perform a mathematical operation. When the first function calls that second function, it can pass variables (or parameters) as inputs to the function to perform the mathematical operation based on those variables. The second function can then perform the mathematical operation and generate a result which can be returned to the first function.

In FIG. 2, this allows the calling function to expect functions A 210, B 215, or C 220 to provide back an integer which can be stored in a specific variable that was initialized as an integer by the calling function for further processing. In FIG. 2, function D 225 and function E 230 are identified as both having "string" return types (e.g., providing a result back in the form of a sequence of characters such as letters forming a word), and function F 235 and function G 240 are identified as having "float" return types (e.g., providing a result back in a form representing a real number). Entry 205 can be the starting point from which any of functions A-G 210-240 are called from (e.g., the function first executed when IR code 135 is executed).

Figure 3:
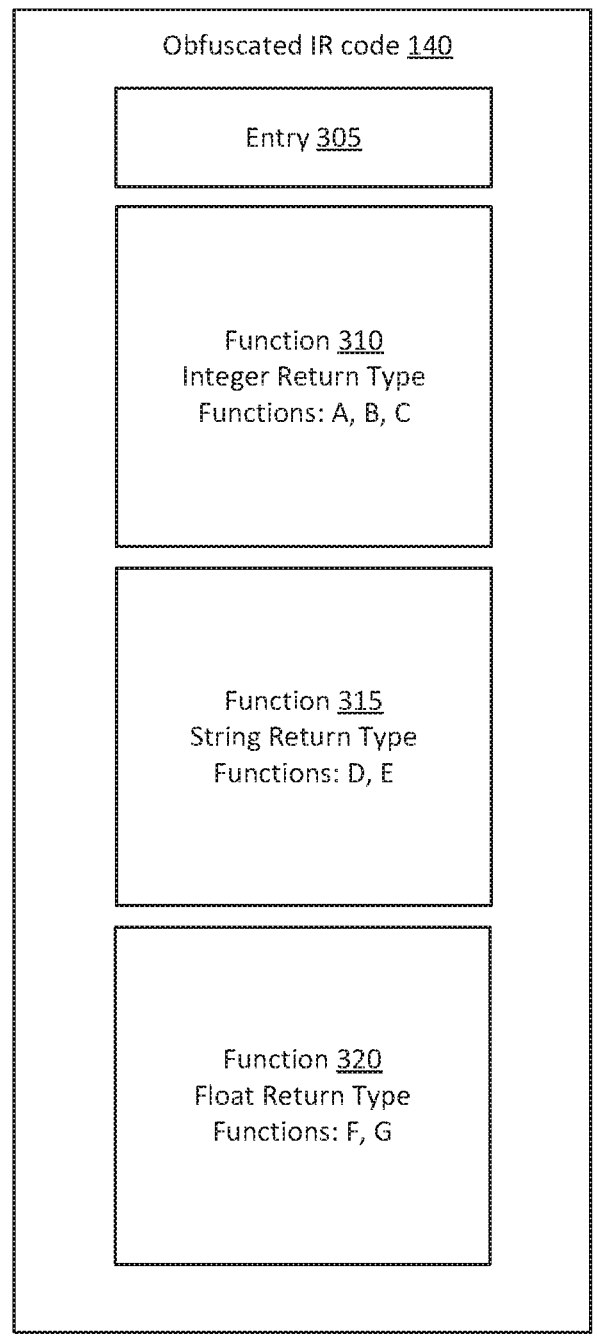
FIG. 3 illustrates an example of grouping functions based on return types.

Functions with a similar return type in IR code 135 can then be grouped together when generating obfuscated IR code 140. FIG. 3 illustrates an example of grouping functions based on return types. In FIG. 3, obfuscated IR code 140 includes entry function 305 used to include instructions that are executed when obfuscated IR code 140 is called, similar to entry 205 of IR code 135 in FIG. 2. However, function 310 includes the instructions and, therefore, the functionality for functions A 210, B 215, and C 220 of IR code 135. That is, the functions of IR code 135 in FIG. 2 that have a return type corresponding to an integer are grouped together into function 310 of obfuscated IR code 140 in FIG. 3. This results in obfuscated IR code 140 having similar or same instructions (i.e., providing similar or same functionality) but with a different organization of those instructions due to the grouping of the functions based on their return types into a single function for each return type. Likewise, function 315 includes the instructions for functions D 225 and E 230. That is, the functions of IR code 135 that have a return type of a string are grouped into function 315 in obfuscated IR code 140. Additionally, function 320 includes the instructions for functions F 235 and G 240 corresponding to a float return type. As a result, to perform the functionality that used to be provided by function A 210 of IR code 135 in FIG. 2, in obfuscated IR code 140 that would involve calling function 310 in FIG. 3 because those instructions were grouped within function 310 of obfuscated IR code 140.

Further obfuscation can be performed by identifying common instructions among functions in IR code 135. For example, in FIG. 2, functions A 210 and B 215 of IR code 135 include common instructions 260 including both instructions A and B. This results in a similar (e.g., same) functionality being performed by some of the instructions in both of those functions A 210 and B 215. By contrast, function C 220 does not include any of the instructions used by functions A 210 and B 215. As a result, when generating obfuscated IR code 140, the multi-pass compiler can identify these instructions and then generate a block within obfuscated IR code 140 including those common instructions 260 as depicted with common block 410 of function 310 in FIG. 4.

Figure 4:
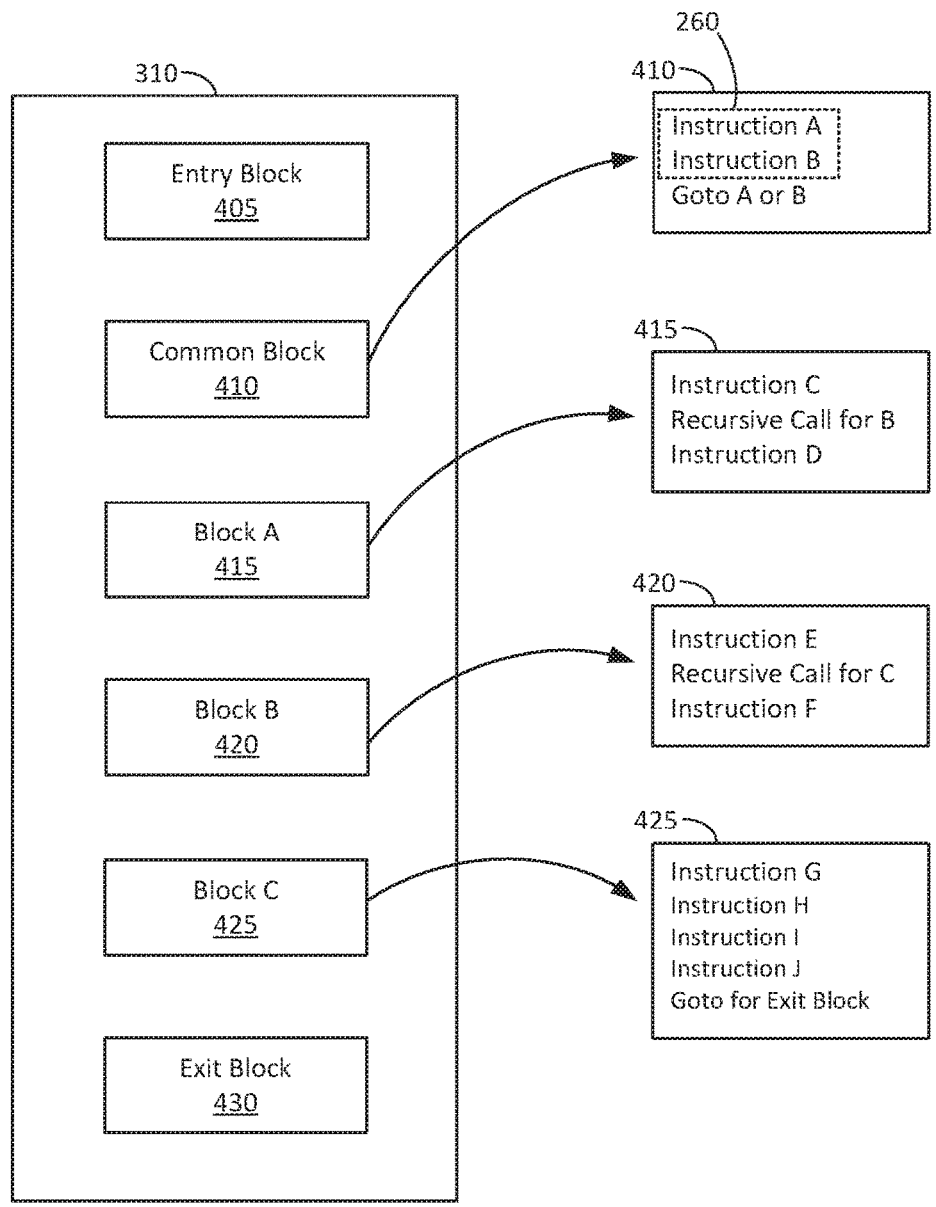
FIG. 4 illustrates an example of identifying common instructions of functions.

FIG. 4 illustrates an example of identifying common instructions of functions. In FIG. 4, function 310 of obfuscated IR code 140 (i.e., the function corresponding to functions having an integer return type of IR code 135 in FIG. 2) can be generated to include entry block 405, common block 410, block A 415, block B 420, block C 425, and exit block 430. Entry block 405 includes instructions that are executed upon function 310 being called and exit block 430 includes the instructions for returning the integer that is the result of calling function 310. Blocks A 415, B 420, and C 425 include some of the instructions of functions A 210, B 215, and C 220, respectively, of IR code 135. However, common instructions 260 of functions A 210 and B 215 as depicted in FIG. 2 is generated as a separate block represented by common block 410 in FIG. 4. That is, the common instructions of the functions with the same return type in IR code 135 are identified and generated as a stand-alone block in FIG. 4, and those instructions do not appear in blocks A 210, or B 215. The instructions of function A 210 such as instruction C and instruction D are provided in the generated block A 415 of function 310. Thus, to provide the functionality that used to be executed by function A 210 of IR code 135, the instructions of common block 410 and block A 415 would be performed. Likewise, instruction C and instruction D of function B 215 are provided in the generated block 420 of function 310. Instructions G-J are also provided for block C 425, similar to the instructions of function C 235 in FIG. 2.

Next, the function calls of the instructions can be modified to recursively call function 310 to provide further obfuscation. That is, the functions with similar return types can call other functions with the similar return type by recursively calling the same function that they are generated within in obfuscated IR code 140. This results in another iteration of function 310 to be executed by having it call itself. For example, in FIG. 4, block A 415 includes an instruction for a recursive call to perform the instructions of block B 420, which would cause the functionality that used to be provided by function B 215 of IR code 135 to be performed. Likewise, block B 420 includes an instruction for a recursive call to perform the instructions of block C 425, which would perform similar functionalities as function C 220 of IR code 135 to be performed. In addition, the instructions performing the recursive call can also pass a parameter indicating the block to be performed to identify an execution path executing the appropriate instructions within function 310.

Figure 5:
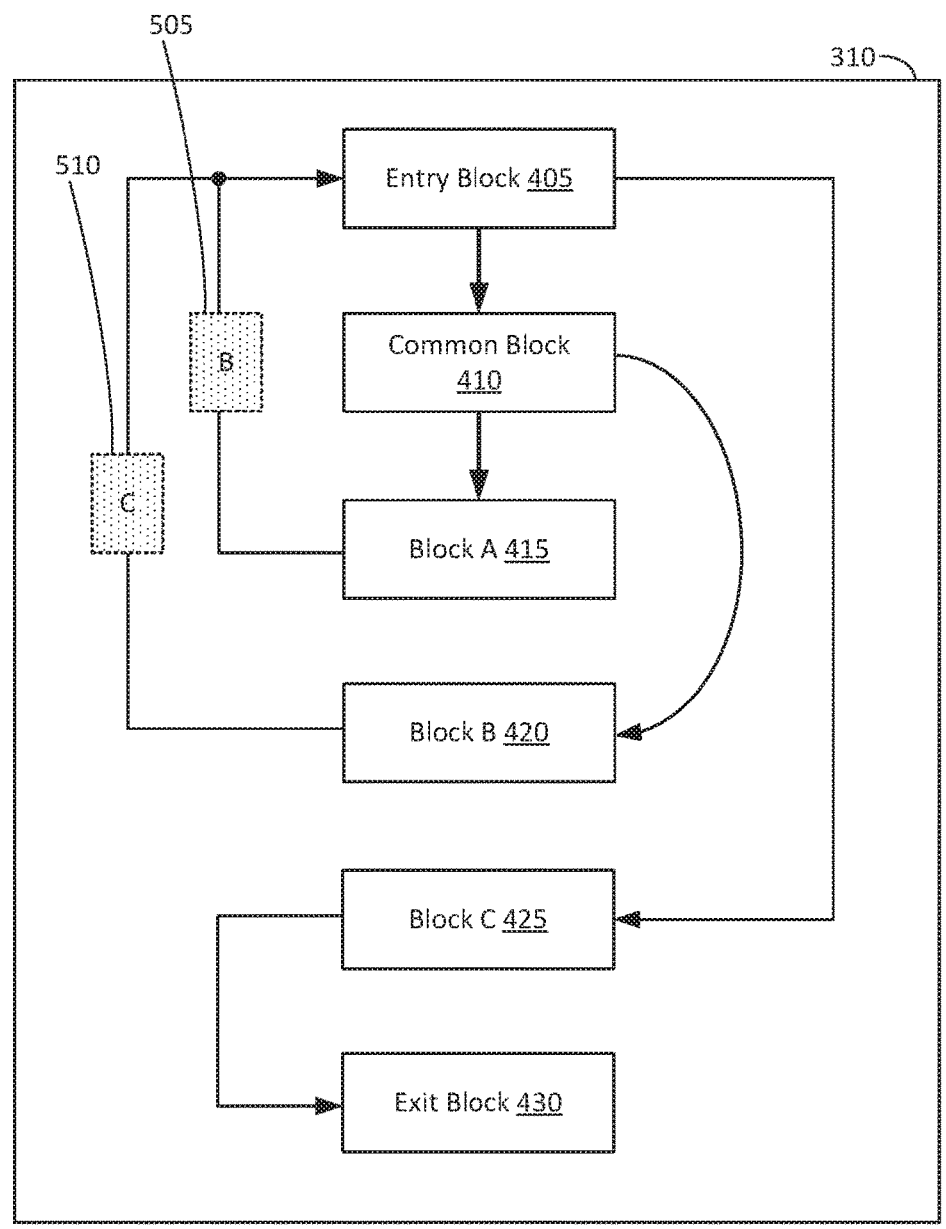
FIG. 5 illustrates an example of execution paths of obfuscated IR code.

FIG. 5 illustrates an example of execution paths of obfuscated IR code. In FIG. 5, if function 310 is called (e.g., by another function within obfuscated IR code 140 such as from function 315 in FIG. 3), then the instructions of entry block 405 can be first executed. This results in the execution path for the current function call of function 310 to proceed to common block 410 in FIG. 5. As depicted in FIG. 4, common block 410 includes common instructions 260 providing instruction A and instruction B which can subsequently be executed. Next, an instruction indicates that either block A 415 or block B 420 can be jumped to. Based on a parameter passed when function 310 was called, or as a default when function 310 is initially called, the execution path can proceed to executing block A 415 in FIG. 5. As depicted in FIG. 4, block A includes results in the execution of instruction C and then a recursive call to perform the functionality of block B 420. As depicted in FIG. 5, parameter 505 indicates that the instructions of block B 420 should be performed and block A 415 includes an instruction to recursively call the same function it is within (i.e., function 310). This results in the instructions of common block 410 to be executed again, but this time the parameter indicates that rather than proceeding to block A 415, parameter 505 indicates that the execution path should execute instructions from common block 410 to block B 420.

As depicted in FIG. 4, this results in the execution of instructions such as instructions E and F in block B 420, but also another recursive call to the same function 310, but to perform instructions related to block C 425 instead. As a result, in FIG. 5, the execution path next transitions back to entry block 405 for the next recursive call from block B 420 while providing parameter 510 indicating that block C 425 should be performed. The instructions in entry block 405 can receive this and then allow for the execution path to go to block C 425 based on parameter 510 being provided in FIG. 5, resulting instructions G-J being performed and then proceeding to exit block 430 in FIG. 4. This ends the current recursive call of function 310. Instruction F of block B 420 can then be performed, which ends that recursive call, and then instruction D from block A 415 can be performed.

By reorganizing the instructions of IR code 135 in FIG. 2 in the manner of obfuscated IR code 140, as well as the detail as described regarding function 310 of obfuscated IR code 140, machine code 145 in FIG. 1 can be used to generate an executable program that can be difficult to reverse engineer and, therefore, prevent unwanted modifications as previously discussed. This can happen because what used to be several functions have been combined into a single function which reduces the number of addresses used and, therefore, makes the executable program difficult to reverse engineer. Moreover, the recursive calls resulting in different execution paths also makes the executable program more difficult to reverse engineer.

Figure 6:
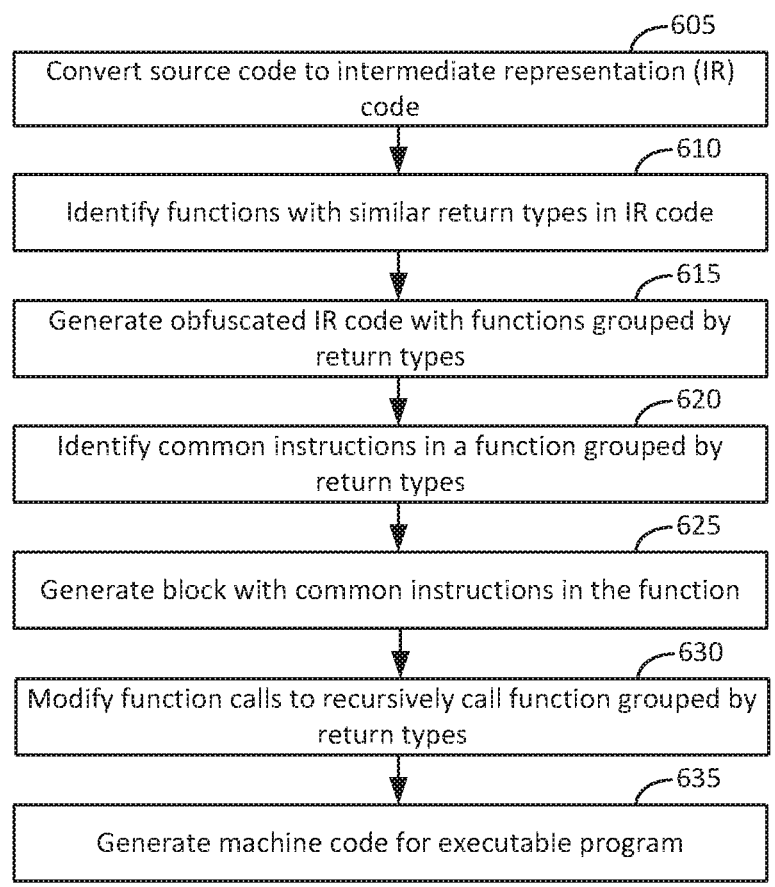
FIG. 6 illustrates an example of a block diagram for obfuscating IR code.

FIG. 6 illustrates an example of a block diagram for obfuscating IR code. In FIG. 6, a compiler can convert source code to an intermediate representation (IR) code (605). For example, in FIG. 1, IR code 135 can be generated during linker level passes stage 110. IR code 135 can be based off of source codes 115 and 120, as previously discussed.

Next, functions with similar return types in the IR code can be identified (610). For example, in FIG. 2, IR code 135 can include several functions, each with a corresponding return type. Functions with similar return types can be identified. For example, in FIG. 2, functions A 210, B 215, and C 220 all have a return type of an "integer" meaning that when the functions are called, they return an integer. In some implementations, the return type is specified when declaring a function and the returned integer (in this example) is also stored in a variable that is declared as an integer. In FIG. 2, functions D 225 and E 230 return a "string" return type and functions F 235 and G 240 return a "float" return type.

Upon identification of the return types in the IR code, an obfuscated IR code can be generated with functions from the IR code grouped by their return types into new functions (615). For example, in FIG. 3, obfuscated IR code 140 includes function 310 which includes the instructions for the functions that had an integer return type in IR code 135 in FIG. 2, for example, functions A 210, B 215, and C 220. Function 315 can group functions D 225 and E 230 from IR code 135 because they both have string return types. Likewise, function 320 can group functions F 225 and G 230 from IR code 135 because they both have a float return type.

To provide an additional type of obfuscation, common instructions in a function of obfuscated IR code 140 grouping functions with similar return types from IR code 135 can be identified (620) and a block with the common instructions can be generated in the function grouping the functions with similar return types (625). For example, in FIG. 2, common instructions 260 include instructions A and B which would be executed if either of function A 210 or function B 215 are executed (or their corresponding blocks A 415 or B 420, respectively, in FIG. 4). Thus, these can be identified as common instructions due to their functionality being used in both of those functions or blocks. Thus, common block 410 can be generated to include common instructions 260.

Recursion can also be added to provide another type of obfuscation. For example, instructions requesting function calls to be performed can be modified to be recursive calls calling the function in obfuscated IR code 140. For example, in FIG. 4, block A 415 of function 310 of obfuscated IR code 140 includes an instruction providing a recursive call to the same function 310 and passing a parameter to function 310 indicating that the instructions of block B 420 should be executed. This is in contrast with function A 210 of IR code 135 in FIG. 2 in which function B 215 is explicitly called without any recursion and, therefore, also no passing of parameters.

Machine code for an executable program can then be generated (635). For example, machine code 145 in FIG. 1 can be eventually generated from obfuscated IR code 140. Because the IR code was modified to be obfuscated, the machine code can be more difficult to reverse engineer than if the obfuscation was performed with source codes 115 and 120. This can happen because the IR code is more detailed, or fine grain than source codes 115 and 120. For example, an instruction from source code 115 might result in several instructions in the IR code and, therefore, there can be more common instructions identified.

Though the example described above uses parameters passed for the recursive calls, in other implementations, the block including the common instructions (e.g., common block 410 in FIGS. 4 and 5) can include a lookup table (LUT) that can be used to lookup the calling addresses. Different blocks would have different calling addresses and, therefore, those can be correlated with which block the execution path should proceed with. For example, block A 415 can be identified as the block that recursively called function 310 and the LUT can identify block B 420 as where the execution path of executing instructions should go to.

Figure 7:
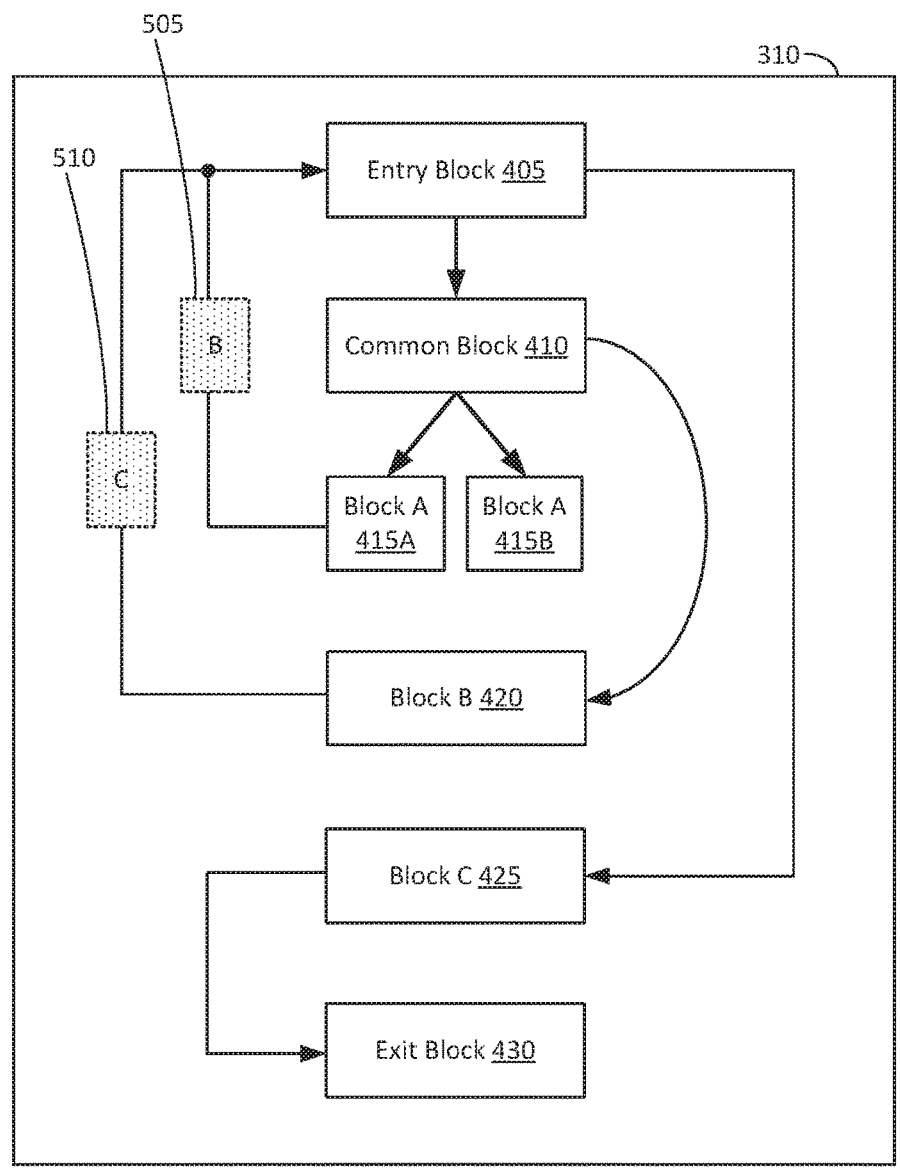
FIG. 7 illustrates an example of execution paths of obfuscated IR code with duplicate blocks.

Additional obfuscation can be provided with duplicate blocks. FIG. 7 illustrates an example of execution paths of obfuscated IR code with duplicate blocks. In FIG. 7, block A has been duplicated with block A 415A and block A 415B. This can include a further modification of instructions of common block 410, for example, deciding which of blocks A 415A or 415B should be executed as part of the execution path. The decision can be made by a random number generator (e.g., if a randomly generated or pseudo-randomly generated number is within a first range of numbers, then the execution path for the instructions can include block A 415A, but if the number is within a second range of numbers then the execution path can instead include block A 415B). In another implementation, a CPUID instruction can be executed and based on the results, one of block A 415A or 415B can be selected to be executed.

In some implementations, only some blocks can be duplicated. For example, characteristics of the blocks can be provided or analyzed by the multi-pass compiler and a block can be duplicated based on those characteristics. The characteristics can include a priority of the block, or the type of functionality that the block is supposed to provide. For example, security or licensing oriented blocks providing instructions for those purposes can be duplicated.

Figure 8:
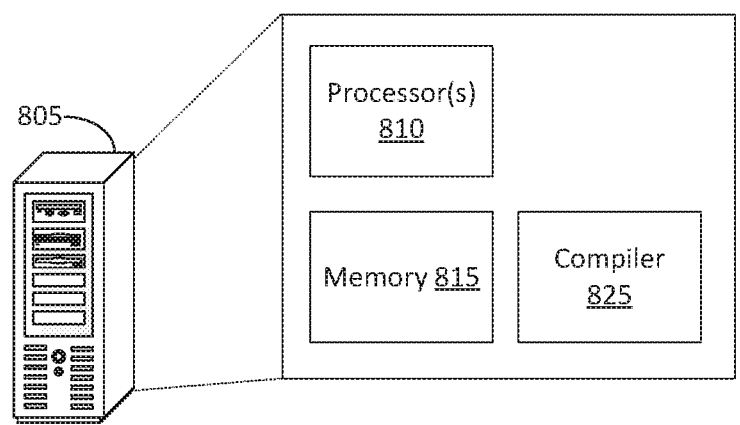
FIG. 8 illustrates an example of a system implementing a compiler.

FIG. 8 illustrates an example of a system implementing a compiler. In FIG. 8, computing device 805 can be a desktop computer, server, etc. that includes a processor 810, memory 815, display 820, as well as other types of hardware such as non-volatile memory, an interface device, camera, radios, display screens, etc. to implement compiler 825 providing the techniques disclosed herein. Various common components (e.g., cache memory) are omitted for illustrative simplicity. The assistant device is intended to illustrate a hardware device on which any of the components described in the example of FIGS. 1-7 (and any other components described in this specification) can be implemented. The components of the assistant device can be coupled together via a bus or through some other known or convenient device.

The processor 805 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method, comprising:
generating, by a processor, a first intermediate representation (IR) code of source code for compiling the source code into machine code;
identifying a first function and a second function having a first return type in the first IR code, the return type indicating a type of a data structure returned by the first function and the second function when called to be executed;
generating, by the processor, a second IR code having a first function including blocks corresponding to the first and second functions from the first IR code that have the first return type;
identifying common instructions between the first function and the second function from the first IR code, the common instructions present in both the first function and the second function of the first IR code, the common instructions providing a same functionality in the first function and the second function;
generating, by the processor, a common block including the common instructions in the first function of the second IR code;
identifying an instruction within the first function of the first IR code representing a function call to the second function of the first IR code; and
generating, by the processor, an instruction within the block corresponding to the first function to recursively call the first function of the second IR code and pass a parameter representing that the second block is to be executed based on the identification of the instruction within the first function of the first IR code represents the function call to the second function of the first IR code.

2. The method of claim 1, further comprising:
generating machine code from the second IR code, wherein the machine code represents an executable program that is a result of compiling the source code using the first IR code and the second IR code.

3. The method of claim 1, further comprising:
identifying a third function and a fourth function having a second return type in the first IR code, the first return type and the second return type being different; and
generating, by the processor, a second function for the second IR code including blocks corresponding to the third and fourth functions from the first IR code that have the second return type, the first function and the second function of the second IR code being different.

4. The method of claim 3, further comprising:
identifying common instructions between the third function and the fourth function from the first IR code, the common instructions present in both the third function and the fourth function of the first IR code; and
generating, by the processor, a common block including the common instructions in the second function of the second IR code.

5. The method of claim 4, further comprising:
identifying an instruction within the third function of the first IR code representing a function call to the fourth function of the first IR code; and
generating, by the processor, an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

6. The method of claim 1, wherein the IR code, the source code, and the machine code each provide similar executable functionality, and wherein the IR code, the source code, and the machine code are each in a different corresponding programming language.

7. The method of claim 1, wherein generating the second IR code corresponds to a linker level pass stage of the compiling, the source code manipulated during a compiler level pass stage of the compiling, the linker level pass stage occurring after the compiler level pass stage.

8. An electronic device, comprising:
one or more processors; and
memory storing instructions, wherein the processor is configured to execute the instructions such that the processor and memory are configured to:
generate a first intermediate representation (IR) code of source code for compiling the source code into machine code;
identify a first function and a second function having a first return type in the first IR code, the return type indicating a type of a data structure returned by the first function and the second function when called to be executed;
generate a second IR code having a first function including blocks corresponding to the first and second functions from the first IR code that have the first return type;
identify common instructions between the first function and the second function from the first IR code, the common instructions present in both the first function and the second function of the first IR code, the common instructions providing a same functionality in the first function and the second function;
generate a common block including the common instructions in the first function of the second IR code;
identify an instruction within the first function of the first IR code representing a function call to the second function of the first IR code; and
generate an instruction within the block corresponding to the first function to recursively call the first function of the second IR code and pass a parameter representing that the second block is to be executed based on the identification of the instruction within the first function of the first IR code represents the function call to the second function of the first IR code.

9. The electronic device of claim 8, wherein the processor is configured to execute the instructions such that the processor and memory are configured to:
generate machine code from the second IR code, wherein the machine code represents an executable program that is a result of compiling the source code using the first IR code and the second IR code.

10. The electronic device of claim 8, wherein the processor is configured to execute the instructions such that the processor and memory are configured to:
identify a third function and a fourth function having a second return type in the first IR code, the first return type and the second return type being different; and
generate a second function for the second IR code including blocks corresponding to the third and fourth functions from the first IR code that have the second return type, the first function and the second function of the second IR code being different.

11. The electronic device of claim 10, wherein the processor is configured to execute the instructions such that the processor and memory are configured to:
identify common instructions between the third function and the fourth function from the first IR code, the common instructions present in both the third function and the fourth function of the first IR code; and
generate a common block including the common instructions in the second function of the second IR code.

12. The electronic device of claim 11, wherein the processor is configured to execute the instructions such that the processor and memory are configured to:
identify an instruction within the third function of the first IR code representing a function call to the fourth function of the first IR code; and
generate an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

13. The electronic device of claim 8, wherein the IR code, the source code, and the machine code each provide similar executable functionality, and wherein the IR code, the source code, and the machine code are each in a different corresponding programming language.

14. The electronic device of claim 8, wherein generating the second IR code corresponds to a linker level pass stage of the compiling, the source code manipulated during a compiler level pass stage of the compiling, the linker level pass stage occurring after the compiler level pass stage.

15. A computer program product, comprising one or more non-transitory computer-readable media having computer program instructions stored therein, the computer program instructions being configured such that, when executed by one or more computing devices, the computer program instructions cause the one or more computing devices to:

generate a first intermediate representation (IR) code of source code for compiling the source code into machine code;

identify a first function and a second function having a first return type in the first IR code, the return type indicating a type of a data structure returned by the first function and the second function when called to be executed;

generate a second IR code having a first function including blocks corresponding to the first and second functions from the first IR code that have the first return type;

identify common instructions between the first function and the second function from the first IR code, the common instructions present in both the first function and the second function of the first IR code, the common instructions providing a same functionality in the first function and the second function;

generate a common block including the common instructions in the first function of the second IR code;

identify an instruction within the first function of the first IR code representing a function call to the second function of the first IR code; and generate an instruction within the block corresponding to the first function to recursively call the first function of the second IR code and pass a parameter representing that the second block is to be executed based on the identification of the instruction within the first function of the first IR code represents the function call to the second function of the first IR code.

16. The computer program product of claim 15, wherein the processor is configured to execute the instructions such that the processor and memory are configured to:

generate machine code from the second IR code, wherein the machine code represents an executable program that is a result of compiling the source code using the first IR code and the second IR code.

17. The computer program product of claim 15, wherein the processor is configured to execute the instructions such that the processor and memory are configured to:

identify a third function and a fourth function having a second return type in the first IR code, the first return type and the second return type being different; and generate a second function for the second IR code including blocks corresponding to the third and fourth functions from the first IR code that have the second return type, the first function and the second function of the second IR code being different.

18. The computer program product of claim 17, wherein the processor is configured to execute the instructions such that the processor and memory are configured to:

identify common instructions between the third function and the fourth function from the first IR code, the common instructions present in both the third function and the fourth function of the first IR code; and generate a common block including the common instructions in the second function of the second IR code.

19. The computer program product of claim 18, wherein the processor is configured to execute the instructions such that the processor and memory are configured to:

identify an instruction within the third function of the first IR code representing a function call to the fourth function of the first IR code; and generate an instruction within the block corresponding to the third function to recursively call the second function of the second IR code and pass a parameter representing that the block corresponding to the fourth function is to be executed based on the identification of the instruction within the third function of the first IR code represents the function call to the fourth function of the first IR code.

20. The computer program product of claim 15, wherein the IR code, the source code, and the machine code each provide similar executable functionality, and wherein the IR code, the source code, and the machine code are each in a different corresponding programming language.

\* \* \* \* \*